(12) United States Patent
Al-badri et al.

(10) Patent No.: US 9,181,398 B2
(45) Date of Patent: Nov. 10, 2015

(54) ORGANOPOLYSILICONE POLYETHER DRAINAGE AID

(75) Inventors: Zoha Al-badri, West Grove, PA (US); Todd S. Bolton, Wilmington, DE (US)

(73) Assignee: Solenis Technologies, L.P. (CH)

( * ) Notice: Subject to any disclaimer, the term of this patent is extended or adjusted under 35 U.S.C. 154(b) by 56 days.

(21) Appl. No.: 13/455,768

(22) Filed: Apr. 25, 2012

(65) Prior Publication Data

US 2012/0273145 A1 Nov. 1, 2012

Related U.S. Application Data

(60) Provisional application No. 61/479,110, filed on Apr. 26, 2011.

(51) Int. Cl.
| | | |
|---|---|---|
| *D21C 9/02* | (2006.01) | |
| *C08G 77/08* | (2006.01) | |
| *C08G 77/14* | (2006.01) | |
| *C08G 77/38* | (2006.01) | |
| *C08G 77/18* | (2006.01) | |
| *C08G 77/46* | (2006.01) | |
| *C08L 83/12* | (2006.01) | |
| *D21H 17/53* | (2006.01) | |

(52) U.S. Cl.
CPC ............... *C08G 77/18* (2013.01); *C08G 77/46* (2013.01); *C08L 83/12* (2013.01); *D21C 9/02* (2013.01); *D21H 17/53* (2013.01)

(58) Field of Classification Search
USPC ............. 162/72, 158; 525/474; 556/400–486
See application file for complete search history.

(56) References Cited

U.S. PATENT DOCUMENTS

| | | |
|---|---|---|
| 217,501 A | 7/1879 | Wright |
| 463,489 A | 11/1891 | Cornish |
| 3,784,479 A | 1/1974 | Keil |
| 3,801,616 A | 4/1974 | Litteral |
| 3,984,347 A | 10/1976 | Keil |
| 4,509,532 A | 4/1985 | DeVries |
| 4,749,740 A | 6/1988 | Aizawa et al. |
| 4,762,640 A | 8/1988 | Schiefer |
| 5,055,229 A | 10/1991 | Pelton et al. |
| 5,247,044 A | 9/1993 | Crivello |
| 5,262,088 A | 11/1993 | Hill et al. |
| 5,283,004 A | 2/1994 | Miura |
| 5,380,464 A | 1/1995 | McGee et al. |
| 5,543,082 A | 8/1996 | McGee et al. |
| 5,908,891 A | 6/1999 | Fey et al. |
| 6,207,722 B1 | 3/2001 | Juen et al. |
| 6,512,015 B1 | 1/2003 | Elms et al. |
| 2003/0065117 A1 | 4/2003 | Poreddy et al. |
| 2005/0119675 A1 | 6/2005 | Adams et al. |
| 2006/0041097 A1 * | 2/2006 | Herrwerth et al. ............... 528/14 |
| 2007/0100153 A1 * | 5/2007 | Brueckner et al. ............ 556/470 |
| 2011/0021688 A1 | 1/2011 | Herzig et al. |

FOREIGN PATENT DOCUMENTS

| | | |
|---|---|---|
| DE | 102005051939 | 5/2007 |
| EP | 0475440 | 3/1992 |
| EP | 0285391 | 2/1993 |
| EP | 0638364 | 1/1998 |
| EP | 1167502 | 4/2004 |
| EP | 1167456 | 9/2005 |
| EP | 1627892 | 2/2006 |
| EP | 1460099 | 6/2006 |
| WO | WO 2012/149019 A1 * | 11/2012 |

OTHER PUBLICATIONS

International Search Report, PCT/US2012/034997, Jul. 26, 2012, pp. 1-2.

* cited by examiner

*Primary Examiner* — Dennis Cordray

(74) *Attorney, Agent, or Firm* — Joanne Rossi; Michael J. Herman

(57) ABSTRACT

The present invention relates to a drainage aid composition and its use in pulp washing process. More particulary, this invention relates to drainage aid composition of silicone polyethers prepared via zinc catalized dehydrogenative coupling of alcohol terminated polyethers with silicone oligomers and polymers comprising of at least one silicon bonded hydrogen. The compostion of this invention exhibit excellent drainage properties.

18 Claims, No Drawings

ORGANOPOLYSILICONE POLYETHER DRAINAGE AID

This application claims the benefit of U.S. provisional application No. 61/479,110 filed Apr. 26, 2011, the entire contents of which are hereby incorporated by reference.

BACKGROUND

Paper is manufactured predominantly from wood fibers as wood pulp. There are three major processes for the production of pulp: wood digestion, brown stock washing, and bleaching. Wood digestion is often referred to as "cooking" and it is the process of using chemicals to dissolve approximately 50% of the wood components facilitating the liberation of wood fibers. Brown stock washing is the process where the fibers are separated from non-fibrous wood components and spent cooking chemicals by using recycled and or clean water and filtrates from other processes as wash water. The non-fiber portion of this stream is referred to as black liquor and is sent to a separate process where the chemicals are recovered. For fine grades of paper, e.g. printing and writing, the fiber is bleached by treatments with oxidizing chemicals to "brighten" the pulp.

Brown stock washing is a critical process in pulp mill operations. Its purpose is to separate spent cooking liquors and undesired degraded wood components from the wood fibers after the cooking process using a minimal amount of wash water. The optimization of this process improves chemical recovery, mill energy balance/usage, reduces unwanted chemical consumption in downstream applications, and decreases environmental impact. When operated effectively, the brown stock washers can be a source of considerable savings to a pulp mill.

It is common for a brown stock washing system to be run inefficiently. Many of the NA operating pulp mills are antiquated and use original process equipment instead of upgrading to newer more efficient washers. A global problem is that due to the complexity of a washing process the operator's are sometimes uncertain of how to correctly respond to unfavorable wash conditions.

Many economically feasible chemical additives have been found to influence the operation of brown stock washers in a positive way. By using filtration theory and how it applies to a washer, it may be possible to better understand how certain processes and chemicals influence a fiber washing process.

Many technologies exist for washing cellulosic fibers, but each design incorporates the same basic principles. These basic principles are dilution and displacement washing. Dilution washing is described as diluting a cellulosic material with cleaner filtrates and wash waters then removing the filtrates and wash waters through a filtration separation process under vacuum or pressure. Displacement washing is done by replacing the liquid portion of cellulosic slurries with cleaner filtrate or wash water under vacuum or pressure. Dilution washing is more effective, but displacement washing uses less water. Typical equipment for washing cellulosic slurries incorporates both dilution and displacement washing, or a series of displacement washing zones. Cellulosic washer designs include perforated drums, porous wires, extraction plates, and screw presses, all either under vacuum, under pressure, or used to form nips for pressing.

Organopolysilicone defoamers functionalized with polyether have been used, mainly, to aid in emulsifying and dispersing defoamer in incompatible mediums. The addition of hydrophobic silica particles in the formulation is mandated by the fact that they play an important roll, along with other ingredients, in foam suppression. The following patents disclose the use of polyether functionalized silicone copolymers, mainly a mixture of polydimethylsiloxane and polydimethylsiloxane-co-polyhydromethylsiloxane copolymers with various molecular weights, as good defoaming agents. The majority of patents use hydrosilylation as a mean to incorporate allyl-functionalized polyethers onto silicone copolymer backbones possessing randomly alternating dimethylsiloxane and methylhydrosiloxane monomer units.

Dow Corning Co. (U.S. Pat. No. 9230049.9) disclosed curable liquid organopolysilicone compositions dispersed in a liquid continuous phase in the form of an emulsion. The curable liquid comprised of organopolysilicone blends of diorganopolysilicone possessing a silicone-bonded hydroxyl group and/or alkoxy group having one to six carbon atoms and silicon resins containing a hydrolyzable functionality. In Kulkarni et al. (U.S. Pat. No. 4,509,532), the viscosity of the dimethylpolysiloxanes oil was in the range of from 5000 to 30,000 cS at 25° C., which improved efficiency in difficult to defoam aqueous systems. Keil et al., (U.S. Pat. No. 3,784,479) disclosed a foam control composition of a base oil selected from polyoxyprolene polymers, polyoxyproylene-polyoxyethylene copolymers or silicone-glycol copolymers combined with dimethylpolysiloxane and silica filler. In another closely related U.S. Pat. No. 3,984,347, Keil disclosed foam control compositions which consisted mainly of base oil selected from polyoxypropylene polymers, polyoxyproylene-polyoxyethylene copolymers or silicone-glycol copolymers, a foam control agent comprising a liquid dimethylpolysiloxane, silica filler, and a silicone copolymer dispersing agent. Similar composition containing higher molecular weight polydimethylsiloxane was reported by Schiefer (U.S. Pat. No. 4,762,640) was also shown to be useful in defoaming of highly acidic aqueous systems. Aizawa et al., (U.S. Pat. Nos. 463,489 and 4,749,740) disclosed a method for producing silicone defoamer compositions containing a mixture of filler, silicone resin and a catalyst to promote reaction of the components at 50° C. to 300° C. Starch, in U.S. Pat. No. 4,983,316, disclosed silicone antifoam emulsions particularly suited for controlling foam in aqueous detergent systems. In this patent, the above mentioned compositions of Aizawa et al. are used in conjunction with a secondary silicone antifoam agent dispersed in a polypropylene glycol continuous phase. McGee et al. (Aus. Pat. No. 34059/89), by combining the above mentioned compositions of Aizawa et al. with particular silicone glycol compounds provided improved antifoams for use in high pH aqueous systems, particularly pulp mill liquors.

Dow Corning Corp. (EUR Pat. No. 116-7502B1), disclosed silicone-based foam control compositions where silicone antifoam/silica particles were dispersed in a detergent compatible carrier. The composition consisted of a silicone-based antifoam agent made from cross-linked silicone and branched silicone fluid. In another patent Dow Corning Corp. revealed the former formulation that used vinyl functionalized MQ resin, cross-linked polymethylhydrosiloxane fluid with a viscosity of 17,000 cSt. methylhydrosiloxane, and vinyl-terminated polymethylhydrosiloxane (450 est) were cross-linked using a platinum catalyst. Dow Corning Corp. (EUR Pat. No. 1167456B1) revealed another formulation by using the same highly cross-linked poly-organosiloxane fluid described in (U.S. Pat. No. 4,749,740), adding mineral oil as another component in the formulation.

Recently, a method for preparing a composition similar to that described by Aizawa et al. was disclosed by Miura (U.S. Pat. No. 5,283,004). It is disclosed that all the ingredients, including a catalyst, must be reacted at elevated temperatures to obtain the desired antifoam agent. John et al. (U.S. Pat. No. 217,501) disclosed a foam control composition that improved performance in high foaming detergent compositions. The defoamer comprised (1) a liquid siliconesili having a viscosity of at least 7×10-3 m2/s at 25° C. and prepared by mixing and heating a triorganosiloxane end-blocked polydiorganosiloxane, the polydiorganosiloxane having at least one terminal silanol group, and an organosiloxane resin comprised of monovalent and tetravalent siloxy units that have at least one silanol group per molecule, and (II) finely divided hydrophobic fillers, McGee et al. (U.S. Pat. No. 5,380,464) disclosed a foam control composition containing a silicone defoamer and a silicone glycol copolymer which is particularly effective in defoaming highly acidic or highly basic aqueous systems. Union Carbide Corp., (EUR Pat. No. 273-4482) edify a foam suppressant composition made by a free radical polymerization of a mixture of diorganopolysilicones, silica particles, and a free radical initiator. A European patent (EUR Pat, No. 0285391) disclosed organopolysilicone emulsions comprising a hydroxyl end blocked organopolysilicone, an aminoxy group containing organosilicon compound, a surfactant, and water. Dow Corning Co. (U.S. Pat. No. 6,207,722 B1) disclosed a defoamer composition made from polysiloxanes and a resin-filler prepared from vinyl-functionalized silanol, trimethylsilyl functonalized silicone resin (MQ resin). Elms et al. (U.S. Pat. No. 6,512,015 B1; Jan 28, 2003; Dow Corning Co.) disclosed a foam control composition prepared by mixing trimethylsiloxane-terminated polydimethylsiloxanes hydroxyl-terminated polydimethylsiloxanes polysilicate resin, and a catalytic amount of potassium silanolate to promote cross-linking between the added components. In addition to this formulation, Silwet L-77® silicone glycol, L-540 silicone polyglycol having block copolymer of PO:EO ratio 50/50, and mineral oil was added. Fey at al. (U.S. Pat. No. 5,908,891) disclosed a dispersible silicone composition comprising (I) a silicone prepared by reacting a trimethylsiloxane-terminated polydimethylsiloxane, a hydroxyl-terminated polydimethylsiloxane, hydrophobic silica particle, and a catalytic amount of alkali metal silinolate to promote the reaction of the other components and (II) mineral oil. Fey et al. further discloses that the mineral oil is effective as a dispersing agent for the silicone composition (I). Willibald et al, (US Pat. Application No. 2011/0021688 A1) owned by Wacker Chemie AG, issued in Aug. 21, 2008, disclosed defoamer formulations using trimethylsiloxane-terminated polyhydromethylsiloxane mixed with allyl polyether with PO/EO ratio of 4.0. The allyl polyether was hydrosilylated onto PHMS using a platinum catalyst at 100° C. The resulting polymer surfactant had a viscosity of 870 mm²/s (25° C.). The polymer was further cross-linked with hexamethylene diisocyanate followed by the addition of Emulan® HE 50 (BASF) to give a final copolymer solution that has a viscosity of 2100 at 25° C. A defoamer composition (EUR Pat. No. 0638346) was disclosed that comprised of a reaction product prepared by heating a mixture of a polyorganosiloxane fluid, a silicon compound, hydrophobic silica particles, and a catalytic amount of potassium silanolate (for promoting the reaction of the other components) at a temperature of 50° C. to 300° C. The patent further disclosed the use of the nonionic silicone surfactants Silwet L-77 and L-540, and hydrophobic silica particles in the final compositions. Kremer, (US Pat. No. 2005/01019675 A1) disclosed a defoamer composition consisting of polymethylhydrosiloxane resins cross-linked with alkyl silicates emulsified in kerosene. This formulation is claimed to require lower amounts of silicone. The final composition contains 90% kerosene and 8% 600,000 centistokes of a cross-linked linear polymethylhydrosiloxane and 2% of a cross-linked branched polydimethylsiloxane and alkyl-silicate.

BRIEF DESCRIPTION OF THE INVENTION

The present invention discloses dehydrogenative coupling (DC) to incorporate polyether onto silicone copolymer backbone. Dehydrogenative coupling is a cost-efficient alternative to hydrosilyation and does not require the used of allylatedpolyglycols, but instead takes advantage of a readily available hydroxyl-terminated polyglycol. The dehydrogenative coupling reaction is assisted by transition metals in the coupling of hydroxyl groups onto polysilicone backbones. One example of a catalyst that can be used in the invention is Wilkinson's catalyst ($[(Ph_3P)]_3RhCl$). This occurs at the Si—H reactive site resulting in a Si—OR bond formation. The byproduct of this process is hydrogen gas which is released into the atmosphere. We have discovered that by using a unique combination of two particular Pluronics (L64 and L81) at a fixed ratio resulted in significant improvement in drainage response comparable or slightly exceeding the performance of the benchmark materials.

DETAILED DESCRIPTION OF THE INVENTION

Silicone polyether compositions which improve drainage of pulp slurry in the paper making process are disclosed.

The invention provides a drainage aid comprising functionalized organopolysilicones comprising pendent polyethers and/or aliphatic hydrocarbons prepared by reacting
a) preferably polyethers of the general formula;

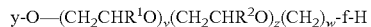

y-O—$(CH_2CHR^1O)_v(CH_2CHR^2O)_z(CH_2)_w$-f-H      i and/or
b) an aliphatic hydrocarbon of the formula

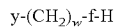

y-$(CH_2)_w$-f-H      II with
c) linear, cyclic or branched organopolysilicones.

In the general formula (i) or (ii): y can be hydrogen or is a monovalent straight-chain, cyclic or branched, saturated, unsaturated or aromatic hydrocarbon radical which has up to 100 carbon atoms. Preferably, y is an aliphatic hydrocarbon moiety wherein the number of carbon atoms is between 1-18, more preferably 1-10 carbon atoms, more preferably between 1-4, or most preferably 1-2 carbon atoms. v is an integer from 1 to 1000, preferably 1 to 500, more preferably 1 to 250, most preferably 1-100 and z is a positive integer ranging from 0 to 1000, preferably from 0 to 500, more preferably 0-250, more preferably 1-250, most preferably 1-100. w is a positive integer ranging from 1 to 18, preferably from 1 to 10, more preferably 1-5, most preferably 1-3. $R^1$ and $R^2$ can be identical or different. $R^1$ can be methyl, ethyl, or propyl, preferably $R^1$ is methyl or ethyl, more preferably $R^1$ is methyl group. $R^2$ can be hydrogen, methyl, ethyl, or propyl, preferably $R^2$ is hydrogen, methyl or ethyl, more preferably $R^2$ is hydrogen or methyl group. Most preferably, $R^1$ is a methyl and $R^2$ is a hydrogen. The structure in equation (i) can be block or random, preferably random. f is a functional group that only exists if w is greater than zero. f is a functional group selected from the group of B, Al, Sn, Si, Ge, O, S, N-$A^1$ (where $A^1$ is hydrogen or a hydrocarbon having 1-3 carbon atoms), $A^2$-P (where $A^2$ is hydrogen or a hydrocarbon having 1-3 carbon atoms or any aromatic ring), phosphate, and —COO—. Preferably, f is oxygen, S, or —COO—, most preferably, f is an oxygen.

The preferred structures of the polyether copolymer used for grafting onto organopolysilicones are depicted in Chemical Structures 1. It is important to note that, in the general formula (i), PPO (polypropylene glycol) and PEO (polyethylene glycol) blocks can be distributed in any desired way. The PO (propylene glycol) and EO (ethylene glycol) units can be randomly distributed (Chemical Structures 1, compound 6 and 7). The most preferred polyether copolymer is a statistically random copolymer 6.

The preferred the $M_n$ (number average molecular weight) range for polyether used to make drainage aid is from 200 to 100,000 Da, more preferably, from 200 to 10,000 Da, most preferably, from 200 to 6000 Da Chemical structures 1. Examples of polyethers

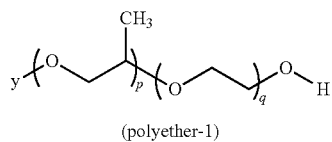
(polyether-1)

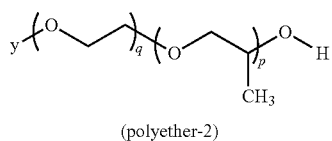
(polyether-2)

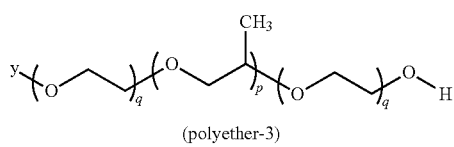
(polyether-3)

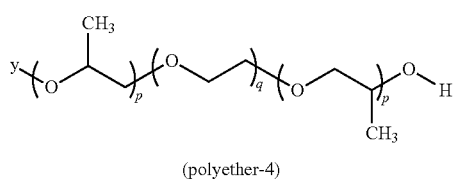
(polyether-4)

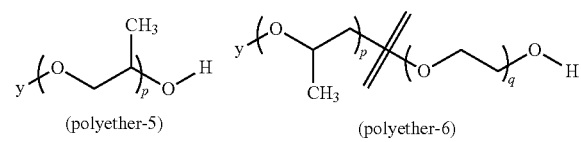
(polyether-5)    (polyether-6)

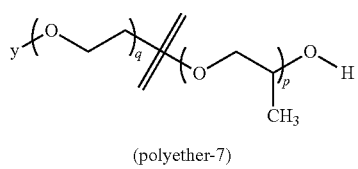
(polyether-7)

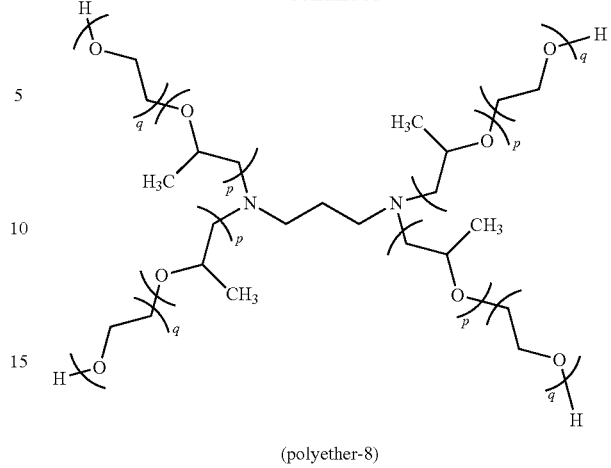
(polyether-8)

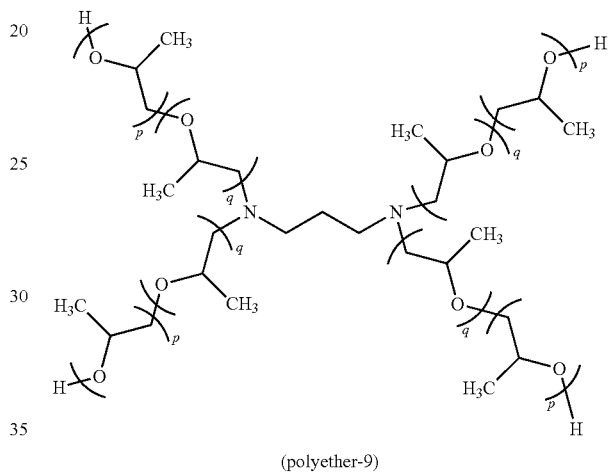
(polyether-9)

q = wt % EO

The p and q represent weight % of PO and EO units in the copolymer, respectively. The preferred weight % value for q spans from 0-99 weight %, more preferably, from 0-60%, most preferably, from 30-60 weight %. The most preferred weight % value for q is between 40-55%. The total sum of p and q is 100%. The sum of the total weight % of PO and EO in the polyether is 100%.

In the general formula (ii), y can be hydrogen or a monovalent straight-chain, cyclic or branched, saturated, unsaturated or aromatic hydrocarbon moiety which has up to 100 carbon atoms, preferably, y is preferably a straight-chain containing 1-18 carbon atoms, more preferably 1-10 carbon atoms, w is a positive integer ranging from 1 to 18, preferably from 1 to 10, more preferably 1-5, most preferably 1-3. f is a functional group selected from the group of B, Al, Sn, Si, Ge, O, S, N-$A^1$ (where $A^1$ is hydrogen or a hydrocarbon having 1-3 carbon atoms), $A^2$-P (where $A^2$ is hydrogen or a hydrocarbon having 1-3 carbon atoms or any aromatic ring), phosphate, and —COO—. Preferably, f is oxygen, S, or —COO—, most preferably, f is an oxygen.

In some embodiments when the alkyl hydrocarbon of the formula (ii) is used to produce the composition of the present invention y can have from 6 to 9 carbon atoms.

The preferred organopolysilicones that are used in making the drainage aid of the present invention are linear, cyclic or branched organopolysilicones copolymer (Chemical Structures 2). In Chemical Structure 2, R can be, identical or different, a methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons and mixtures thereof. More preferably R is a phenyl, ethyl or methyl radical; most preferably R is a methyl radical. $R_3$, identical or different, can be hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons. Preferably, $R^3$ is selected from hydrogen, methyl, ethyl, and phenyl radicals. The most preferred $R^3$ is methyl.

Chemical Structures 2. Example of silicone compounds

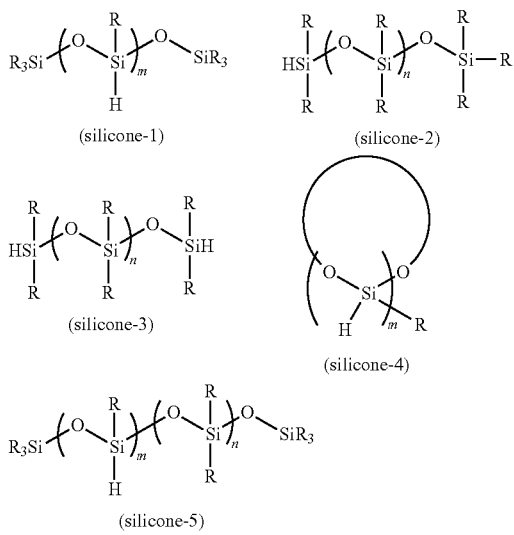

The most preferred organopolysilicone copolymers are those having general formula (iii).

$$H_{3-g}R^6{}_gSiO(R^3SiHO)_m(R^4{}_2SiO)_nSiR^5{}_hH_{3-h} \quad (iii)$$

wherein,
g is 2 or 3,
h is 2 or 3,
n is 0 or an integer from 1 to 2000 and
m is 0 or an integer from 1 to 1000
the sum of m and n is always at least one $R^3$ and $R^4$ in the general formula (iii) are alkyl radicals and are identical or different. $R^3$ and $R^4$, identical or different, can be methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons and mixtures thereof. Preferably $R^3$ and $R^4$ are selected from methyl, ethyl, and phenyl radicals. $R^5$ and $R^6$ in the general formula (iii) are hydrogen or alkyl radicals and are identical or different. $R^5$ and $R^6$, identical or different, can be hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons. Preferably $R^5$ and $R^6$ are selected from hydrogen, methyl, ethyl, and phenyl radicals. When $R^5$ or $R^6$ is hydrogen, g or h, respectively is 3. The most preferred alkyl radicals in general formula (iii) for organopolysilicones are methyl radicals.

The preferred organopolysilicones used in this invention are copolymers comprising hydrogenalkylsiloxy and dialkylsiloxy units, more particularly copolymers comprising hydrogenmethylsiloxy and dimethylsiloxy units, with the stipulation that there exist at least one Si-bonded to hydrogen atom, preferably at least 2 Si-bonded hydrogen atoms, per molecule, more preferably between 2 to 15.

In formula (iii) it is important to note that m —(SiRHO)— and n —(SiR$_2$O)— repeating units can be distributed in any desired way in the molecule. With a particular preference when g in formula (iii) is zero, the mole % for hydrogen-bonded-silicon can range from 0 to 100 mole %. In one embodiment of the invention the mole % of hydrogen-bonded-silicon is 1 to 10 mole %. In another embodiment hydrogen-bonded-silicon is 10 to 20 mole %. In yet another embodiment hydrogen-bonded-silicon is 20 to 60 mole %. In yet another embodiment the mole % of silicon-bonded-hydrogen is 20-40 mole %. It is important to note that the sum of mole % for hydrogen-bonded-silicon-bonded and dimethyl-bonded-silicon is always equal to 100%.

The organopolysilicones, in the general formula (iii), preferably possess an average viscosity of 1 to 20,000 cSt (at 25° C.), more preferably 1 to 10,000 cSt (at 25° C.), most preferably, 1 to 1000 cSt (at 25° C.), and with particular preference for values between 1 and 50 cSt (at 25° C.).

It is preferred to use a catalytic amount of organometallic zinc compounds to promote the coupling of Si—H to primary or secondary alcohols. It is possible in the process of this invention to employ any catalysts which promotes the addition of Si—H to alcohol derivatives. The catalyst is preferably finely divided zinc particles which may be present on supports such as silica, alumina or activated carbon, or compounds or complexes of zinc, such as zinc halides, e.g., $ZnCl_2$, Zinc(II) acetylacetonate, $ZnSO_4$, Zinc Borate, $Zn(C_{18}H_{35}O_2)_2$, ZnO, $ZnCO_3$, zinc acetate.

The silicone polyether drainage aid can be prepared by reacting polyether, and or aliphatic hydrocarbons described above (Chemical Structures 1), with organopolysilicones (Chemical Structures 2). The Si—H unit on the organopolysilicone polymers reacts with the polyether or aliphatic hydropcarbon resulting in either pendant polyether groups or polyether end groups or aliphatic groups on the silicone polymer depending on the original location of the Si—H unit on the silicone polymer.

In one embodiment of the invention the organopolysilicone is preferably, comprised of 1-100 mole % MeSiHO with a viscosity of 1-100 cSt. This process is catalyzed by zinc salt under inert anhydrous conditions, (such as a nitrogen purge) and temperature range from about 80° C. to about 160° C.

in one embodiment of the invention the drainage aid comprises the generic structure shown in Chemical Structure 3.

Chemical Structure 3. Generic structure for silicone polyether drainage aid.

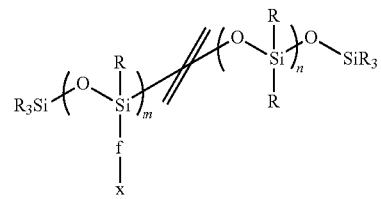

In Chemical Structure 3, R is any of the hydrocarbon radicals of Formula (iii). More preferably R is a phenyl, ethyl or methyl radical; most preferably R is a methyl radical. R can be identical or different. $R_3$ is hydrogen or alkyl radicals and are identical or different. $R_3$, identical or different, can be hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons. Preferably, $R^3$ is selected from hydrogen, methyl, ethyl, and phenyl radicals. The most preferred $R^3$ is methyl. The functional group f is a divalent radical covalently linked to the silicone backbone. f is a functional group selected from the group of B, Al, Sn, Si, Ge, O, S, N-$A^1$ (where $A^1$ is hydrogen or a hydrocarbon having 1-3 carbon atoms), $A^2$-P (where $A^2$ is hydrogen or a hydrocarbon having 1-3 carbon atoms or any aromatic ring), phosphate, and —COO—. Preferably f is —S—, NH, —COO—, or oxygen; most preferably f is an oxygen radical. The pendant group x, is the hydrocarbon moiety resulted from the coupling reaction of the functional group, "f", on the polyether or aliphatic hydrocarbon with the hydrogen-bonded-silicon of the silicone polymer backbone.

x can be:

y—O—$(CH_2CHR^1O)_v(CH_2CHR^2O)_2(CH_2)_w$— as described in formula (i) and for y-$(CH_2)_w$— as described in formula (ii)

Preferably, x is an aliphatic hydrocarbon having 1-18 carbon atoms, a polyether, or any of the polyether copolymers described in Chemical Structures 1. The grafted pendant group x can be identical or a mixture of multiple polyethers. Moreover, the pendant group x can be a mixture of polyethers as described in the general formula (i) and aliphatic hydrocarbon radicals as described in the general formula (ii). Preferably, x is selected from the group of polyethers described in Chemical Structures 1.

In one embodiment of the invention x comprises polyether-6 (Chemical Structures 1) with EO wt % ranging from 0 to 99 wt % and $M_n$ (number average molecular weight) ranging from 100 to 100,000 Da. In another embodiment, x is selected from polyether 6 (Chemical Structures 1) comprising of 35-55 wt % EO and a Mn~500-5000 Da.

The drainage aid of the invention can comprise at least one of the generic structures shown in Chemical Structure 3.

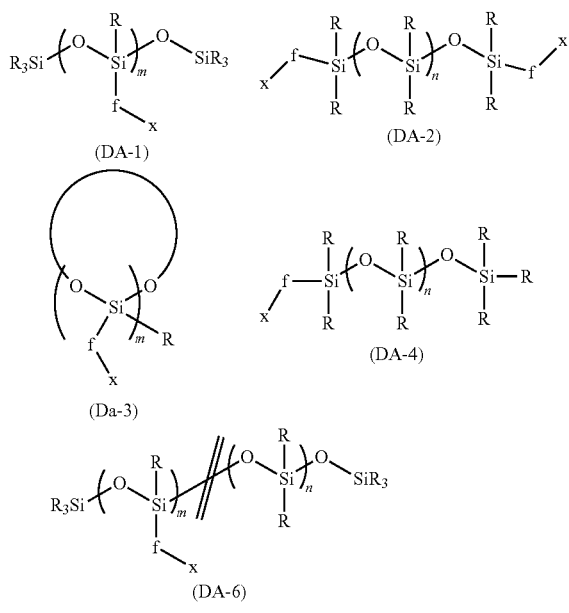

(DA-1)
(DA-2)
(Da-3)
(DA-4)
(DA-6)

wherein

R comprises phenyl, ethyl or methyl, m is an integer from 1 to 1000, n is 0 or an integer from 1 to 2000, f comprises, identical or different, a divalent radical selected from the group consisting of of B, Al, Sn, Si, Ge, O, S, N-$A^1$ (where $A^1$ is hydrogen or a hydrocarbon having 1-3 carbon atoms), $A^2$-P (where $A^2$ is hydrogen or a hydrocarbon having 1-3 carbon atoms or any aromatic ring), phosphate, and —COO—, preferably f is —S—, —NH—, —COO—, or oxygen.

x comprises, identical or different, a polyether moiety, a mixture of moieties of polyethers or a mixture of a polyether moiety and a saturated or un-saturated hydrocarbon radical containing 1 to 18 carbon atoms, the residue or the polyether comprising the formula -y-O—$(CH_2CHR^1O)_v(CH_2CHR^2O)_z(CH_2)_w$— y is an aliphatic hydrocarbon moiety wherein the number of carbon atoms is between 1-18, v is an integer from 1 to 1000, z is a positive integer ranging from 0 to 1000, w is a positive integer ranging from 1 to 18, $R^1$ is methyl, ethyl, or propyl, $R^2$ is hydrogen, methyl, ethyl, or propyl, and $R_3$ is hydrogen or alkyl radicals and are identical or different. $R_3$, identical or different, can be hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons. Preferably, $R^3$ is selected from hydrogen, methyl, ethyl, and phenyl radicals. The most preferred $R^3$ is methyl.

In some embodiments of the invention the silicone polyether comprises DA-6 and and x comprises a polyether-6 moiety, q is 45-50 wt %, y is a n-butyl radical and the viscosity of DA-6 is from about 10,000 cp to about 50,000 cp (100% solids).

In one embodiment of the invention the viscosity of DA-6 is from about 15,000 to about 30,000 cp (100% solids).

In some embodiments x is a mixture of polyether moieties and hydrocarbon radicals wherein at least one polyether moiety is a polyether-6 moiety and at least one hydrocarbon radicals is a linear aliphatic hydrocarbon consisting of 1-18 carbon atoms, preferably-9 carbons.

In some embodiments x is a mixture of polyether moieties and hydrocarbon radicals wherein at least one polyether moiety is a polyether-6 moiety and at least one hydrocarbon radicals is a linear aliphatic hydrocarbon consisting of 1-18 carbon atoms, preferably-9 carbons, wherein and the linear aliphatic hydrocarbon comprises from 10 to 90 mole % of the x moieties, preferably from 20 to 80, more preferably from 30 to 65 mole % of the x moieties.

In some embodiments the wt% of polyether moiety in the composition is from 30 to 50 wt %.

The condition to synthesize the drainage aid requires the polyether to be dried, under inert conditions, such as a nitrogen purge, prior to use. This is done by heating the polyether in the reaction vessel at 90-120° C., preferably at 90-140° C., more preferably from 90-160° C. for at least 2 hours, or longer in order to lower the water content below 1000 μL, preferably less than 1.00 μL, preferably less than 0.005 μL, less than 0.0001 μL. The water content can be from 1000-1.00 μL, preferably water content is as low as 1.0-0.005 μL, more preferably as low as 0.005-0.0001 μL most preferably lower than 0.0001 μL.

Following the drying process, a catalytic amount of zinc (II) acetylacetonate is added to the reaction. Preferably, 1.0-0.5 wt % is added, more preferably, 0.5-0.1 wt %, most preferably 0.1-0.01 wt %.

Organosilicone polymer is gradually added over a period of 15-120 min, preferably 15-90 min, more preferably 15-60 min, most preferably 15-30 min.

It is preferred that the reaction be quenched by cooling the reaction to ambient temperature. Generally the reaction is quenched 6-14 hours from the time the addition of organosilicone polymer was complete, more preferably 6- 10 hours, most preferably 6-8 hours.

The mole percent of polyether used is dependant on the moles of Si—H bonds in the silicone compounds. It is preferred that there be a molar excess of polyether plus aliphatic hydrocarbon containing a functional group f, with respect to the moles of Si—H bonds. If an aliphatic hydrocarbon containing a functional group is not used then the molar amount of polyether to Si—H bonds is preferably 1:1 to 1.5:1, more preferably from 1:1 to 1.25:1. If an aliphatic hydrocarbon containing a functional group is used then the sum of the molar amount of aliphatic hydrocarbon and polyether to Si—H bonds is preferably 1:1 to 1.5:1, more preferably from 1:1 to 1.25:1. In general there will be a greater percent of polyether than aliphatic hydrocarbon used. Maintaining a molar excess of reactants to Si—H bonds in the silicone is preferred. The ratio of polyether to aliphatic hydrocarbon is chosen to maintain an overall hydrophilic nature to the resulting silicone polyether polymer.

It was observed by Pelton et al. (New Insights into Dispersed Air Effects in Brown Stock Washing. TAPPI Journal, 84 (1). 2001) that the size of air bubbles entrained in a fiber mat can have a significant impact on drainage. Bleached fiber and soap water was used in their studies, and through the use of a MacMaster laboratory pulp washer they were able to capture this phenomenon on film. It was concluded that air bubbles >10 mm had less of an impact on filtration resistance than bubbles <2 mm. The bubbles >10 mm rise to the surface of the mat relatively unhindered, and through this create channels increasing the permeability of the mat. The smaller air bubbles remain with the fiber in the mat, creating blockages and increased surface area, adding to filtration resistance. They also demonstrated through the use of defoamers, these smaller air bubbles would coalesce to a greater degree before they became entrapped within the fiber mat, which decreased filtration resistance. The natural surfactants present in black liquor results in smaller bubbles which are stabilized against coalescence. Coalescence is further minimized by the reduced mobility of the bubbles due to the physical barriers by the fibers. We believe that bubbles are prone to being attached to the fibers in the slurry. Therefore, as the fiber mat is formed under dynamic filtration conditions, air is entrapped within the mat because of this bubble attachment. We also observed that larger bubbles do not remain in the slurry but rise to the surface, but by increasing shear, which breaks up the bubbles, increased the amount of air entrained. In our hypothesis we believe that the drainage aids do not affect bubble size, but hinder the bubble attachment to the fiber surfaces, Our data shows that there is a decrease in air entrainment in the pulp slurry when the drainage aid is present. With less bubble attachment the mat formation occurs with lower air entrainment and increases filtration rates.

The composition of the present invention is used to improve the filtration of pulp and pulp mats in washing and thickening operations of a cellulosic processing plant, more specifically a pulp mill. The composition of the invention is added to an application either prior to pulp dilution, during pulp dilution, or shower water for mat displacement washing. The composition of the invention is added in the range of 0.001 to 4.000 lbs for every 2000 lb of cellulosic material in the process. The cellulosic slurries are generally aqueous. They can range from 0.01 to 30% solids, but are more preferably from 0.01 to 0.05% solids. The addition of the composition of the invention will have the effect of increasing the removal or wash through of the liquid filtrates used in processing the cellulosic material.

The composition can be used for improving drainage and filtration rates in cellulosic washing and de-watering processes. The composition is added to an aqueous slurry containing cellulosic material. The composition is added at a dosage of from 0.001 to 4 lb for every 2000 lb of cellulosic material in the aqueous slurry. The solids content of the aqueous slurry is generally from 0.01 to 30% solids.

The aqueous slurry preferably can have a pH in the range of from 10.5 to 13.5.

The aqueous slurry can be derived from a brown stock washing process, a bleach plant process, a market pulp machine process or other processes.

EXAMPLES

Working Example-1

To a 500 mL reaction vessel equipped with an overhead stirrer, 500 g of UCON 50-HB-5100 (Dow Chemicals, Midland, Mich.) was added. The reaction vessel was gradually heated to 150° C. and stirred at 150° C. for 2 hours. Zinc(II) acetylacetonate (Strem Chemicals, Newburyport, Mass.) (0,01 wt % was added to the reaction vessel followed by gradually adding 2.0 wt % of polyhydromethylsiloxane (Grelest, Inc., Morrisville, Pa.) over 1.4 hours. The reaction was allowed to stir at 150° C. for an additional 4 hours before it was quenched by cooling the reactor to ambient temperature Scheme-1.

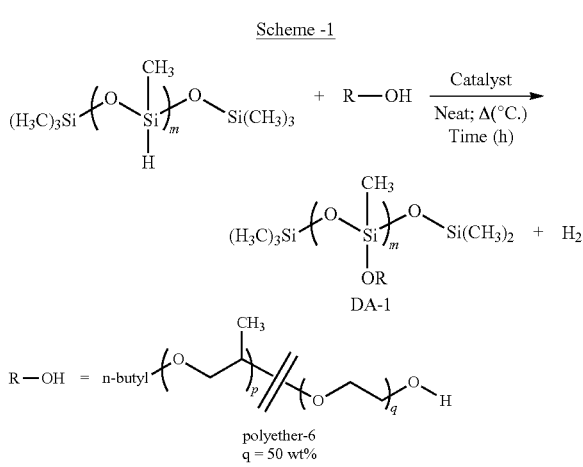

Working Example-2

To a 500 mL reaction vessel equipped with an overhead stirrer, 72.54 g of UCON 50-HB-5100 (Dow Chemicals) (polyether-6) was added. The reaction vessel was gradually heated to 160° C. using a heating mantle and stirred at 160° C. for 2 hours. Zinc(II) acetylacetonate (Strem Chemicals)(0.04 wt %) was added to the reactor in powder form. Hydride terminated polydimethylsiloxane (Gelest) 52 wt % was then added to the reaction in three separate doses of 26.6 g over a period of 1 hour. After the addition of silicone was complete, the reaction was allowed to stir at 160° C. for an additional 5 hours. The reaction was quenched by cooling the reactor to ambient temperature (Scheme-2).

Scheme-2

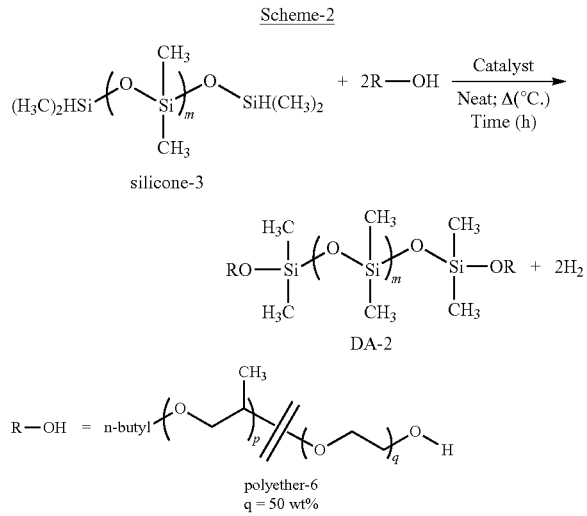

Working Example-3

To a 500 mL reaction vessel equipped with an overhead stirrer, 300 g of UCON 50-HB-5100 (Dow Chemicals) was added. The reaction vessel was gradually heated to 160° C. using a heating mantle and stirred at 160° C. for 2 hours. 0.03 wt % of Zinc(ll) acetylacetonate (Strem Chemicals) was added to the reactor in powder form. 15 wt % of tetramethylhydrocyclosiloxane (Gelest)) was injected into the reaction over a period of 1 hour. After the injection of tetramethylhydrocyclosiloxane was complete, the reaction was allowed to stir at 160° C. for up to 5 hours. The reaction was quenched by cooling the reactor to ambient temperature (Scheme-3).

Scheme-3

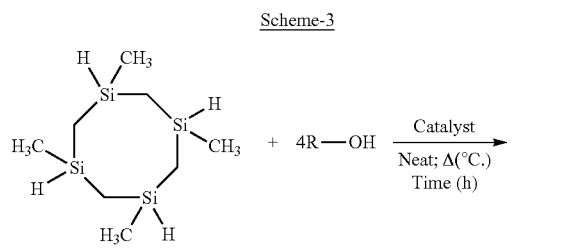

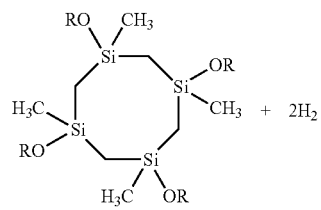

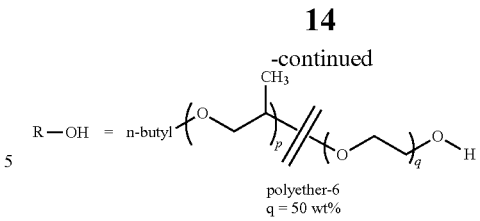

Working Example-4

To a 500 mL reaction vessel equipped with an overhead stirrer, 38 g of Pluronic L64 (BASF) (q=40 wt %) and 62g of Pluronic L81 (BASF) (q=10 wt %), were added to the vessel. The reaction vessel was gradually heated to 135° C. and stirred at 135° C. for 2 hours. 0.01 wt % of Zn(II)acetylacetonate (Strem Chemicals) was then added followed by a gradual addition of 15 wt % of polydimethysiloxane-co-polyhydromethylsiloxane (25-Gelest; 30 mole % $CH_3HSiO$; 25-35 cSt) over 2 h. After the addition of silicone copolymer was complete, the reaction was stirred at 135° C. for an additional 30 min. The reaction was quenched by cooling the vessel to ambient temperature. % yield was 95% (Scheme-4).

Scheme-4

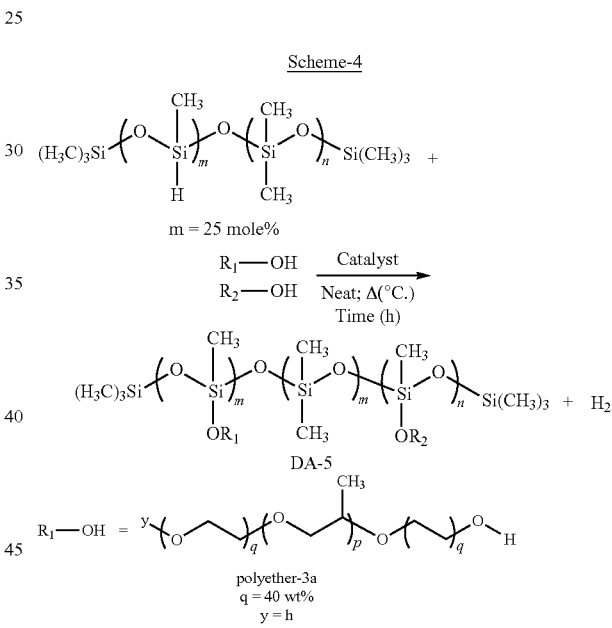

Working example-5

To a 500 ml reaction vessel equipped with an overhead stirrer, 300 g of UCON 50-HB-5100 (Dow Chemicals) was added. The reaction vessel was gradually heated to 150° C. using a heating mantle or oil bath and stirred at 150° C. for 2 hour. 0.03 wt % of zinc(II) acetylacetonate (Strem Chemicals) was then added to the reaction vessel followed by a gradual addition of 6.0 wt % of polydimethysiloxane-co-polyhydromethylsiloxane (25-Gelest; 30 mole % $CH_3HSiO$; 25-35 cSt) over 1 hour. After the injection of the silicone copolymer was complete, the reaction was allowed to stir at 150° C. for 5 hours to insure complete consumption of Si—H for a total reaction time of 6 hours. The reaction was quenched by cooling the product to ambient temperature. % yield was 98%-90% (Scheme-5).

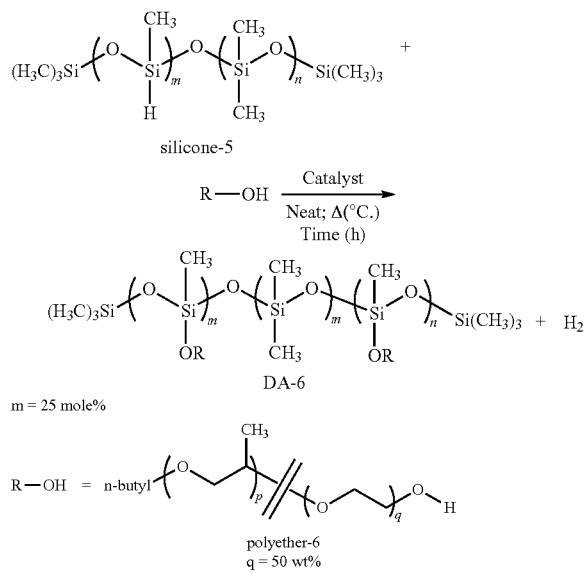

Working Example-6

To a 500 mL reaction vessel equipped with an overhead stirrer, 200 g of 1-nonanol (Sigma-Aldrich, St. Louis, Mo.) was added. The reaction vessel was gradually heated to 150° C. using a heating mantle or oil bath and stirred at 150° C. for 1 hour. 0.01 g of zinc(II) acetylacetonate was then added to the reaction vessel followed by gradual addition of 148 g of polydimethysiloxane-co-polyhydromethylsiloxane (25-Gelest; 30 mole % $CH_3HSiO$; 25-35 cSt) over 1 hour. After the injection of the silicone copolymer was complete, the reaction was allowed to stir at 150° C. for 5 hours to insure complete consumption of Si—H for a total reaction time of 7 hours. The reaction was quenched by cooling the product to ambient temperature. % yield was about 90%.

Working Example-7

To a 500 mL reaction vessel equipped with an overhead stirrer, 200 g of UCON 50-HB-5100 (Dow Chemicals) and 8.91 g of 1-nonanol (Sigma-Aldrich) were added. The reaction vessel was gradually heated to 150° C. using a heating mantle or oil bath and stirred at 150° C. for 2 hour. 0.01 g of zinc(II) acetylacetonate was then added to the reaction vessel followed by a gradual addition of 65.67 g of polydimethysiloxane-co-polyhydromethylsiloxane (25-Gelest; 30 mole % $CH_3HSiO$; 25-35 cSt) over 80 minutes. After the injection of the silicone copolymer was complete, the reaction was allowed to stir at 150° C. for 5 hours to insure complete consumption of Si—H. The reaction was quenched by cooling the product to ambient temperature. % yield was about 90-95%.

Example 8

Drainage test: Black liquor and pulp were mixed to obtain a pulp consistency of 3% (based on dry pulp). The pulp slurry was then mixed under high shear and ran in a drainage apparatus at 85 C°. After mixing, the slurry was filtered with a screen, under moderate vacuum in the drainage apparatus. The screen was sized to ensure that the path of greatest resistance was through the fibrous mat during filtering. The flow rate of filtrate was then measured and used as the basis for determining treatment efficacy.

The synthesized compounds of examples 1-5 and 7 were tested against black liquor/cellulosic fibers having 3.0-2.5% consistency. The results are described in Table 1. Shorter drainage times correspond to efficient drainage aid. Table 1 indicates that the shortest drainage time was observed with DA-5 and DA-6a. DA-5 was made from mixing two types of polyether having different HLBs, polyether-3a (HLB~6) and polyether-3b (HLB~15-18). By tuning the ratio of the two compounds polyether the HLB of the compound can be adjust to optimize drainage time. In the case with DA-5, a net HLB of ~9 was obtained by mixing 38 g of polyether-3a and 62 g of polyether-3b. Alternatively, by using a statistically random EO/PO copolymer with 50 wt % EO also resulted in good drainage time which is also due to the right balance between the hydrophilic and hydrophobic components of the copolymer.

TABLE 1

Drainage Times

| Sample | Drainage Time (sec) | Increase in Drainage Rate from Untreated |
|---|---|---|
| Untreated | 30.8 | n/a |
| DA-1 (from example 1) | 27.4 | 11% |
| DA-2 (from example 2) | 27.3 | 11% |
| DA-3 (from example 3) | 30.1 | 2% |
| DA-5 (from example 4) | 14.9 | 52% |
| DA-6a* (from example 5) | 16.1 | 48% |
| DA-6b** (from example 7) | 27.5*** | 11% |

*Silicone Polyether Compound of Structure DA-6
**Silicone Polyether and Aliphatic hydrocarbon Compound of Structure DA-6
***Calculated drainage time based on measured drainage rate from a similar pulp slurry.

DA-3 provided only a small improvement in drainage. It is theorized that reducing the hydrophilicity of DA-3 will provide better drainage.

The invention claimed is:

1. A drainage aid composition comprising functionalized organopolysilicones comprising pendent polyethers and/or aliphatic hydrocarbons compounds having the general formula:

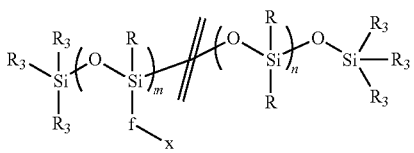

wherein the repeating units are block or random,
wherein R comprises, identical or different, hydrogen, phenyl, ethyl or methyl moiety,
n is an integer from 1 to 1000,
m is a positive integer ranging from 1 to 1000,
f is selected from the group consisting of B, Al, Sn, Si, Ge, O, S, phosphate, —COO—, N-$A^1$ and $A^2$-P,
$A^1$ is a hydrogen or a hydrocarbon having 1-3 carbon atoms, $A^2$ is a hydrogen or a hydrocarbon having 1-3 carbon atoms or any aromatic ring, x comprises y-O—$(CH_2CHR^1O)_v(CH_2CHR^2O)_z(CH_2)_w$— or y-$(CH_2)_w$—, y comprises an aliphatic hydrocarbon moiety wherein the number of carbon atoms is between 1-18, v is an integer from 1 to 1000, z is 0 or a positive integer ranging from 1 to 1000, w is a positive integer ranging from 1 to 18, $R^1$ is methyl, ethyl, or propyl, and $R^2$ is hydrogen, methyl, ethyl, or propyl $R_3$, identical or different, is selected from the group consisting of hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons; and a catalyst selected from finely divided zinc.

2. A composition comprising functionalized organopolysilicones comprising pendent polyethers and/or aliphatic hydrocarbons selected from the following structures:

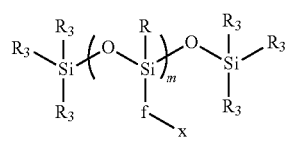
(DA-1)

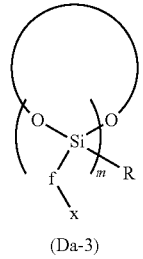
(Da-3)

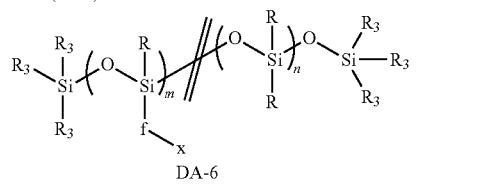
DA-6 wherein
R is, identically or differently, a phenyl, ethyl or methyl moiety,
m is an integer from 1 to 1000,
n is 0 or an integer from 1 to 2000,
f is identical or different, a divalent radical selected from the following; —S—, —N $A^1$—, —COO—, and oxygen,
$A^1$ is a hydrogen or a hydrocarbon having 1-3 carbon atoms,
x, identical or different, is selected from the group consisting of identical or different polyether moieties, identical or different saturated or un-saturated hydrocarbon radicals or mixtures thereof, wherein the polyether moieties have the general formula (i)
y-O—$(CH_2CHR^1O)_v(CH_2CHR^2O)_z(CH_2)_w$— wherein the hydrocarbon radicals have the general formula (ii) y-$(CH_2)_w$—, wherein y is an aliphatic hydrocarbon moiety wherein the number of carbon atoms is between 1-18, v is an integer from 1 to 1000, z is a positive integer ranging from 0 to 1000, w is a positive integer ranging from 1 to 18, $R^1$ is methyl, ethyl, or propyl, $R^2$ is hydrogen, methyl, ethyl, or propyl, and $R_3$, identical or different, is selected from the group consisting of hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons; and a catalyst selected from finely divided zinc.

3. The composition of claim 2 wherein x comprises at least one polyether moiety.

4. The composition of claim 1 or 2, wherein x comprises at least two polyether moieties selected from the group consisting of

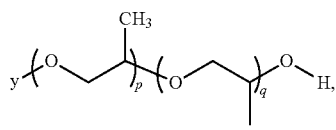
polyether-1

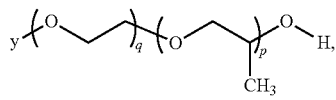
polyether-2

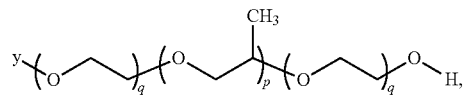
polyether-3

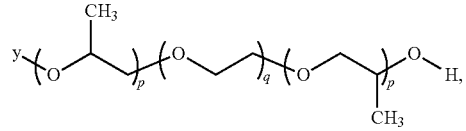
polyether-4

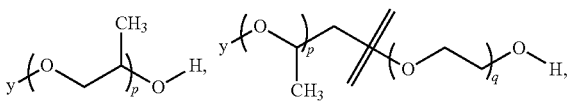
polyether-5    polyether-6

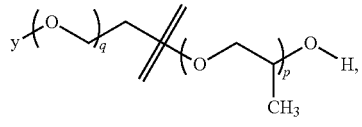
polyether-7

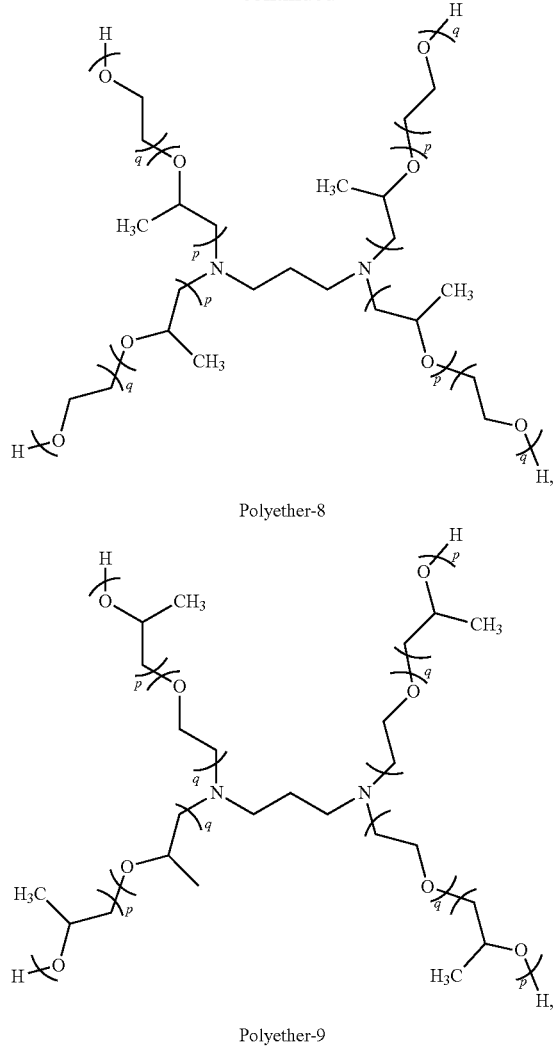

Polyether-8

Polyether-9 and mixtures thereof;
wherein p and q are the weight % of propylene glycol and ethylene glycol units of the functionalized organopolysilicones.

5. The composition of claim 4, wherein x comprises a mixture of moieties wherein the mixture comprises at least one polyether moiety selected from the group consisting of polyether-1, polyether-2, polyether-3, polyether-4, polyether-5, polyether-6, polyether-7, polyether-8, and polyether-9, and at least one aliphatic moiety selected from the general formula (ii).

6. The composition of claim 5, wherein x comprises a mixture of polyether moieties and hydrocarbon moieties wherein at least one polyether moiety is a polyether-6 moiety and at least one hydrocarbon moiety is a linear aliphatic hydrocarbon consisting of 1-18 carbon atoms, preferably from 1-9 carbon atoms.

7. The composition of claim 2, wherein the functionalized organopolysilicone comprises DA-6.

8. The composition of claim 1 or 2, wherein the aliphatic hydrocarbon comprises from 10 to 90 mole % of the x moieties.

9. The composition of claim 2, wherein at least one polyether moiety comprises polyether-3, wherein the weight percent, "q", of ethylene oxide units in the polyether is from 0 to 99.99%.

10. The composition of claim 4, wherein x comprises a mixture of at least two polyethers
a) polyether 3 with a q of from 30 to 40 wt %, and
b) polyether 3 with a q of from 5 to 20 wt %.

11. The composition of claim 10 wherein wt % of polyether 3 with a q of from 30 to 40 wt % in the composition is from 30 to 40 wt % of the composition.

12. The composition of claim 4 wherein the functionalized organopolysilicone comprises DA-6 and wherein x comprises a polyether-6 moiety, wherein polypropylene glycol (PO) and polyethylene glycol (EO) units are randomly distributed and wherein the weight percent of EO in polyether-6 is from 10 to 90 wt %.

13. The composition of claim 12 wherein weight percent of EO in polyether-6 is from 40 to 55 wt %.

14. The composition of claim 12, wherein the functionalized organopolysilicone comprises DA-6 and wherein x is a mixture of moieties wherein the mixture comprises at least one polyether-6 moiety and at least one additional polyether moiety selected from the group consisting of polyether-1, polyether-2, polyether-3, polyether-4, polyether-5, polyether-7, polyether-8, polyether-9 and mixtures thereof.

15. A method of making the composition of claim 1 comprising:
heating a polyether or aliphatic hydrocarbon, under inert conditions at a temperature of from 90° C.-160° C. for at least two hours to reduce the water content below 1000, adding an organosilicone polymer to the polyether in the presence of a zinc catalyst wherein the amount of catalyst added to the reaction vessel is from 0.5-1.0 wt % based on the amount of reactants, allowing the components to react, cooling the reaction vessel to ambient temperature after the completion of silicone addition to the reaction vessel.

16. A method of improving drainage and filtration rates in cellulosic washing and de-watering processes compromising
adding a functionalized organopolysilicones comprising pendent polyethers and/or aliphatic hydrocarbons compounds having the general formula:

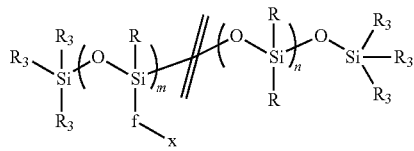

wherein the repeating units are block or random,
wherein R comprises, identical or different, hydrogen, phenyl, ethyl or methyl moiety,
n is an integer from 1 to 1000,
m is a positive integer ranging from 1 to 1000,
f is selected from the group consisting of B, Al, Sn, Si, Ge, O S, phosphate, —COO—, N-$A^1$ and $A^2$-P,
$A^1$ is a hydrogen or a hydrocarbon having 1-3 carbon atoms,
$A^2$ is a hydrogen or a hydrocarbon having 1-3 carbon atoms or any aromatic ring,
x comprises y-O—$(CH_2CHR^1O)_v(CH_2CHR^2O)_z$ $(CH_2)_w$— or y-$(CH_2)_w$—,
y comprises an aliphatic hydrocarbon moiety wherein the number of carbon atoms is between 1-18,
v is an integer from 1 to 1000,
z is 0 or a positive integer ranging from 1 to 1000, w is a positive integer ranging from 1 to 18, $R^1$ is methyl, ethyl, or propyl, and $R^2$ is hydrogen, methyl, ethyl, or propyl $R_3$, identical or different, is selected from the group consisting of hydrogen, methyl, ethyl, n-propyl, isopropyl, 1-n-butyl, 2-n-butyl, isobutyl, tert-butyl, alkyl radicals with 5-18 carbon atoms, substituted and un-substituted aromatic hydrocarbon, fluorocarbon, halocarbon, and cyclic hydrocarbons; and a catalyst selected from finely divided zinc, to an aqueous slurry containing cellulosic material wherein the composition is added at a dosage of from 0.001 to 4 lb for every 2000 lb of cellulosic material in the aqueous slurry and wherein the solids content of the aqueous slurry is from 0.01 to 30% solids.

17. The method of claim 16 wherein the aqueous slurry has a pH in the range of from 10.5 to 13.5.

18. The method of claim 16, wherein the aqueous slurry is derived from the group consisting of a brown stock washing process, a bleach plant process, and a market pulp machine process.

\* \* \* \* \*